June 22, 1948.　　　　G. A. LYON　　　　2,443,626
WHEEL COVER
Filed Nov. 1, 1943
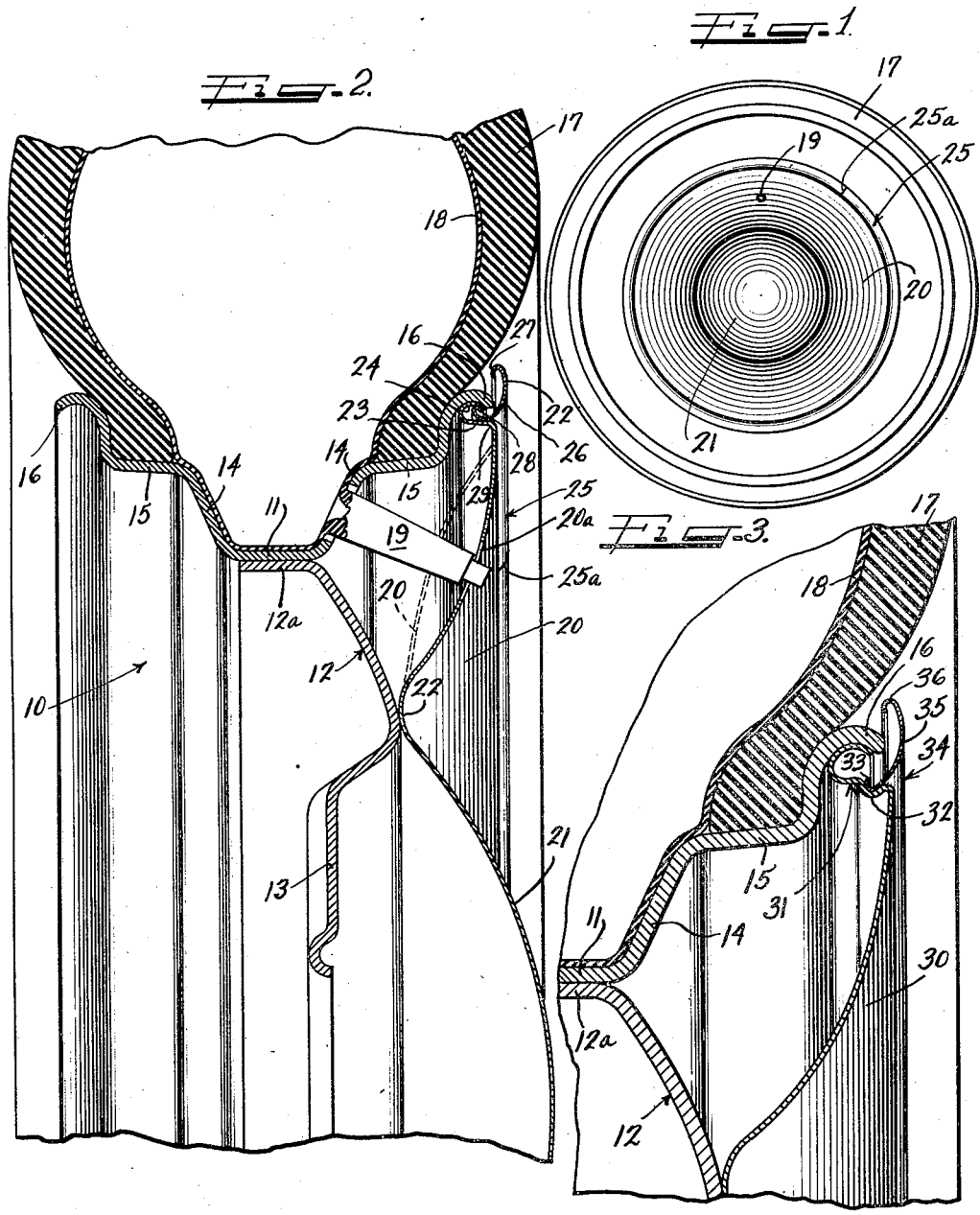
Inventor
GEORGE ALBERT LYON.

Patented June 22, 1948

2,443,626

UNITED STATES PATENT OFFICE 2,443,626

WHEEL COVER

George Albert Lyon, Allenhurst, N. J.

Application November 1, 1943, Serial No. 508,468

9 Claims. (Cl. 301—37)

The present invention is directed to an improved wheel structure and relates more particularly to an improved cover assembly therefor.

It is a principal object of the present invention to provide for a wheel structure, an improved cover assembly and particularly improved retaining means for maintaining the cover assembly over the outer side thereof.

It is another object of the present invention to provide for a wheel structure a cover assembly for disposition over the outer side thereof, said cover assembly being formed from a locally flexible, temporarily, resiliently distortible material such as sheet synthetic plastic or the like, whereby it is provided with characteristics enabling it to be self-sustaining and form retaining and yet resiliently deflectable to provide access to the rear side thereof for servicing a tire valve or other appurtenances associated with the wheel structure.

It is a further object of the invention to provide for a wheel structure, an improved cover assembly having a radially outer annular part formed from locally, temporarily, resiliently, flexible material, said annular cover portion extending radially outwardly to a point beyond the radially outer extremity of the wheel with which it is associated and having improved retaining means for maintaining the same over the outer side of the wheel structure, said retaining means being so arranged as to provide for floating movement of the outer peripheral part of the annular cover portion, whereby said part may move radially inwardly under the influence of abutment by a laterally expanded tire in the wheel structure in the event that the tire is accidentally deflated during use.

It is a further object of the present invention to provide for disposition over the outer side of a wheel structure having a tire rim and a central load bearing portion, a circular cover, said cover having an outer annular portion provided with a cross-sectional configuration of such shape and magnitude that it extends generally from the outer part of the tire rim radially inwardly beyond the junction between the rim and the central load bearing portion and generally simulates the side wall of a tire in the tire rim, thereby to give the appearance of being a continuation thereof and to give the appearance of being a white side wall of a massive tire mounted on a wheel structure, when colored white.

It is a further object of the present invention to provide for disposition over the outer side of a wheel structure, a cover assembly including an outer annular cover portion, the outer part of which extends generally into the vicinity of the radially outer extremity of the tire rim and circular retaining means for engaging with substantially the radially outer part of the cover and the edge portion of a tire rim over which the cover is disposed to attach the cover to the wheel structure.

It is a still further object of the invention to provide for a wheel structure, an improved cover assembly in which the outer portion thereof is arranged to detachably engage the tire rim of a wheel over which it is disposed, there being additional, circular retaining means for engaging the radially outer part of the cover and the radially outer part of the tire rim of a wheel over which the cover is disposed to augment the attached relationship between the cover and the wheel.

It is still another important object of the present invention to provide for disposition over the outer side of a wheel structure, a circular cover member having a radially outer portion arranged to detachably engage a portion of the wheel and having at the radially outer part thereof, a circular ornamental bead member which serves as a strengthening and rigidifying medium and also serves as an ornamental border for the cover.

In accordance with the general features of the present invention as shown in certain embodiments herein, there is provided for disposition over the outer side of a wheel structure having a tire rim and a central load bearing portion, a resiliently flexible circular cover having an edge terminating in the vicinity of the edge portion of the tire rim, said edge being arranged for interlocking engagement with the edge portion of the tire rim and being further interlockingly engaged with a circular reinforcing member made from relatively rigid material, this reinforcing member serving as a radially outward continuation of the cover member to provide an ornamental border or bead therefor.

In accordance with other forms of the invention shown herein, the ornamental, reinforcing border or bead member is arranged to extend radially outwardly beyond the edge portion of the tire rim so as to conceal the junction between the same and a tire in the rim, the cover and the ornamental bead being so arranged that they may float radially inwardly upon engagement of a laterally expanded, deflated tire therewith.

Many other objects and advantages of the present invention will become apparent from the following description and accompanying drawings in which:

Figure 1 is a side elevational view of a wheel structure embodying one form of my invention;

Figure 2 is a fragmentary, cross-sectional enlarged view of the construction shown in Figure 1;

Figure 3 is a fragmentary, enlarged cross-sectional view of a modified form of my invention.

It will be understood that the embodiments disclosed herein are for illustrative purposes only and may be changed or modified without departing from the spirit and scope of the invention as set forth in the appended claims.

In the construction shown in Figures 1 and 2, the wheel assembly with which my invention is associated includes a tire rim 10 having a base flange 11 to which may be secured, as by welding or riveting or the like, an axially inwardly extending peripheral skirt 12a of a central load bearing portion 12. The central load bearing portion is further provided with a radially inner bolt-on flange 13 to which may be secured in any suitable manner, as by bolts or the like, an appropriate portion of the vehicle, such as a brake drum or the like.

The tire rim 10 is further provided with opposite side wall flanges 14, opposite intermediate flanges 15 and opposite edge portions 16, between which are disposed a suitable pneumatic tire 17 having an inner tube 18 provided with a valve stem 19, this valve stem being arranged to extend through a suitable aperture in the adjacent side wall flange 14.

The cover assembly shown in Figures 1 and 2 includes a disk-like member having a radially outer annular portion 20 and a radially inner circular, crowned portion 21, these portions being joined by a circular junction portion 22 cross-sectionally configurated to extend axially inwardly and into supporting abutment with an adjacent portion of the outer surface of the central load bearing portion 12. Preferably the cover assembly including portions 20 and 21 is formed from sheet synthetic plastic material or the like, thereby to have characteristics enabling it to be self-sustaining and form retaining and yet locally resiliently flexible. Thus it will be seen that in the event of engagement of the central crowned portion 21 with curbing or the like, that portion will be indented temporarily, but will spring axially outwardly immediately upon the relief of distorting pressures therefrom. Similarly the annular portion 20 which is provided with an aperture 20a through which the outer end of the valve stem 19 may be accessible, can be flexed axially inwardly as shown in dotted lines in Figure 2, whereby the outer end of the valve stem protrudes outwardly therefrom to afford application of the nozzle of an air hose thereto for inflating the tire.

To the end that the cover assembly may be securely retained upon the wheel structure, the radially outer marginal part thereof is formed to provide a generally axially inwardly extending flange 23 which is provided with a portion 24 bent back thereon to extend generally axially outwardly. Preferably the bent back flange 24 is provided with a cross-sectional curvature such that it generally conforms to the configuration of a radially inwardly opening groove formed by the radially inwardly curved edge portion 16 of the tire rim. It is contemplated that when in normal unattached position, the circle described by the flange 24 will be somewhat larger than that described by the radially inwardly opening groove at the radially inner side of the edge portion 16 so that in attaching the cover to the wheel structure the operator need merely align the cover with the tire rim and then apply axial inward pressure until the junction part 22 of the cover abuts the central load bearing portion 12, whereupon the radially outer part and particularly the flange 24 may be progressively snapped axially inwardly behind the hump provided by the circular extremity of the edge portion 16.

When the cover is in this position it will be seen that the flange 24 and, in fact, the entire cross-sectional expanse of the circular cover member will be placed under a condition of stress due to the confinement of the flange 24 in the groove of the edge portion 16 of the tire rim 10. Under these circumstances the attachment between the wheel and the cover is maintained under pressure and a secure, detachable engagement is attained.

To the end that the radially outer margin of the cover member may be protected against abrasion or dislodgment, rigidified and ornamented, there is provided herein a circular, split member 25 which is provided with a generally radially extending, axially outwardly convex intermediate portion 26 and axially inwardly curled, bent back flanges 27 and 28. As will be seen from Figures 1 and 2, the ring 25 is preferably split at 25a.

After the cover member has been applied to the wheel structure in the aforementioned manner, the split ring 25 may be curled into open position and starting at one end thereof, the flange 28 may be sprung progressively into the recess formed between the flange 23 and flange 24 of the cover member with the extremity of the flange 28 of the ring resting tightly in outwardly expanding condition against the radially inner surface of the extremity of the flange 24, thereby to further augment the attachment thereof to the edge portion 16 of the tire rim 10.

When the ring 25 is inserted in the aforementioned position by progressive insertion of the radially inner part thereof within the edge portion 16 of the tire rim 10, it will be seen that the attachment of the flange 24 to the wheel structure is greatly augmented and furthermore it will be seen that the intermediate portion 26 thereof extends radially outwardly beyond the edge portion 16 to conceal the junction between the same and the tire 17. This adds greatly to the appearance of the assembled structure and furthermore serves as a protective medium for the radially outer part of the cover and particularly the corner junction 20 between the annular cover portion 20 and the axially inwardly extending flange 23. Thus, should the vehicle be driven against a curbing with such force that the side wall of the tire is pressed axially inwardly beyond the axial outer extremity of the wheel and cover construction, the ring 25 which is preferably constructed from stainless steel and provided with a high polish or constructed from regular steel and provided with a chrome finish, is engaged by the curbing so that the relatively more breakable sheet synthetic plastic material is protected.

In removing the cover assembly from the wheel structure it will be seen that the operator need merely draw the ring 25 axially outwardly by finger engagement against the radially outer part thereof in the vicinity of the split 25a, whereupon the ring may be progressively removed from around the tire rim. Thereafter the point of a pry-off tool may be inserted in the recess between the flanges 23 and 24 of the cover and the edge portion may be used as a fulcrum so that radial inward movement of the point of the pry-off tool will dislodge the flange 24 of the cover from the edge portion 16 of the tire rim.

With the foregoing construction it will be seen that in the event that the tire is punctured and thus becomes accidentally deflated and assumes an extreme laterally expanded position, the tire will engage the rounded surface provided by the flange 27 of the ring 25 whereby the ring, at the point engaged, will float inwardly and carry the flexible cover member radially inwardly away from the edge portion of the tire rim until this distorting pressure is relieved, whereupon the parts will assume their normal position without any damage having been done.

The construction shown in Figure 3 includes a wheel structure and tire assembly identical to that shown in Figure 2. In this construction the cover assembly possesses all of the attributes of the assembly shown in Figures 1 and 2 and described above. However, in this construction, the cover 30 is provided at the radially outer portion thereof with a generally axially inwardly extending flange 31 which is provided with a circular, radially outwardly opening recess 32 into which the radially inner flange 33 of a ring 34 may be seated. In other words, it will be seen that in this construction, as differentiated from that of Figure 2, the ring 34 is maintained upon the wheel structure by direct engagement with the groove 32 in the cover member 30 instead of being detachably secured to the edge portion 16 of the tire rim 10.

When the construction of Figure 3 is arranged in foregoing manner it will be seen that the arcuate intermediate portion 35 of the ring 34 extends radially outwardly of the edge portion 16 of the tire rim to conceal the junction between the same and the tire 17 and that here again, the assembly is so arranged that the ring 34 protects the cover against damage by abrasion or abutment against curbing or the like. Furthermore it will be seen that should the tire be punctured and thus accidentally assume an extreme laterally expanded condition, the tire side wall will abut the rounded surface formed by the turned back flange 36 at the radially outer part of the ring 34.

What I claim is:

1. In a wheel structure having a central load bearing portion and a tire rim, including edge portions extending generally axially outwardly and curled slightly radially inwardly to provide a generally radially inwardly opening groove at the radially inner side thereof, a cover assembly including a cover member having the characteristics of being self-sustaining as to form and yet locally, resiliently, temporarily flexible so as to spring back into normal configuration when distorting pressures are relieved therefrom, said cover being provided at the radially outer margin thereof with a generally axially extending, integral flange of cross-sectional configuration conforming to the configuration of the radially inner surface of the edge portion of the tire rim, thereby to be adapted for nested, retaining engagement in said radially inwardly opening groove defined by said edge portion, and rigidifying, protective means in said assembly including a ring member having a body portion extending radially outwardly beyond the edge portion of the tire rim and having a radially inner part arranged for engagement against the radially inner surface of said axially extending flange of the cover which is disposed in nested relationship with the edge portion of the tire rim.

2. In a wheel structure having a central load bearing portion and a tire rim provided with an edge portion extending generally axially outwardly and curled slightly radially inwardly to define a radially inwardly opening groove, a cover assembly having physical characteristics enabling it to be self-sustaining as to form and yet locally, resiliently, temporarily flexible so that it will spring back to initial, normal configuration when distorting pressures are relieved therefrom, said cover having at the radially outer margin thereof, a generally axially extending flange cross-sectionally shaped to conform to the configuration of the radially inwardly opening groove defined by the edge portion of the tire rim so as to be disposed in nested, retained engagement in said groove when the cover is attached to the wheel structure, said cover member having a generally radially outwardly facing circular groove formed therein at a point radially inwardly of said axially extending flange and a generally radially extending rigidifying annulus having a radially inner portion arranged to interfit in said groove in the cover member to be retained thereon and also having a portion extending radially outwardly beyond the edge portion of the tire rim.

3. In a wheel structure having a central load bearing portion and a tire rim provided with an edge portion extending generally axially outwardly and curled slightly radially inwardly to define a radially inwardly opening groove, a cover assembly having physical charactersitics enabling it to be self-sustaining as to form and yet locally, resiliently, temporarily flexible so that it will spring back to initial, normal configuration when distorting pressures are relieved therefrom, said cover having at the radially outer margin thereof, a generally axially extending flange cross-sectionally shaped to conform to the configuration of the radially inwardly extending groove defined by the edge portion of the tire rim so as to be disposed in nested, retained engagement in said groove when the cover is attached to the wheel structure, said cover member having a generally radially facing circular groove formed therein and a generally radially extending rigidfying annulus having a radially inner portion arranged to interfit in said groove in the cover member to be retained therewith upon the wheel structure and also having a portion extending radially outwardly beyond the edge portion of the tire rim.

4. In a wheel structure having a central load bearing portion and a tire rim provided with a flange portion extending generally axially outwardly and formed to define a radially inwardly opening groove, a cover member having resilient characteristics, said cover member having at the radially outer marginal portion thereof an outwardly opening grooved formation defined at its radially outer side by a generally axially outwardly extending flange cross sectionally shaped to engage retainingly in the radially inwardly opening groove in said tire rim flange, and an annulus attached to the cover member in substantially concealing relation to said axially outwardly opening peripheral groove.

5. In a wheel structure having a central load bearing portion and a tire rim provided with a flange portion extending generally axially outwardly and formed to define a radially inwardly opening groove, a cover member having resilient characteristics, said cover member having at the radially outer marginal portion thereof an outwardly opening grooved formation defined at its radially outer side by a generally axially outwardly extending flange cross sectionally shaped to engage retainingly in the radially inwardly opening groove in said tire rim flange, and an annulus attached to the cover member in substantially concealing relation to said axially outwardly opening peripheral groove, said annulus being flexible and arranged to extend radially outwardly with respect to the cover member to a point radially outwardly of the radially outer extremity of the tire rim and being arranged to flex radially inwardly upon being subjected to radial inward pressures by abutment with a deflated tire in the rim or with curbing or the like.

6. As an article of manufacture, a circular cover member having an outer marginal formation extending axially, then radially outwardly and then in reverse axial direction with the latter portion formed to conform generally with and retainingly engage in a radially inwardly opening groove formation in a tire rim flange, there being a space between the radially outer portion and the radially inner portion of said peripheral formation defining a groove at the periphery of the wheel cover member, and a bordering annulus secured to the cover member and substantially concealing said groove.

7. As an article of manufacture, a circular cover member having an outer marginal formation extending axially, then radially outwardly and then in reverse axial direction with the latter portion formed to conform generally with and retainingly engage in a radially inwardly opening groove formation in a tire rim flange, there being a space between the radially outer portion and the radially inner portion of said peripheral formation defining a groove at the periphery of the wheel cover member, and a bordering annulus secured to the cover member and substantially concealing said groove, said bordering annulus having an inner marginal portion extending into the groove in the cover member and being of a width to extend beyond said radially outer portion of the marginal formation.

8. As an article of manufacture, a circular cover member having an outer marginal formation extending axially, then radially outwardly and then in reverse axial direction with the latter portion formed to conform generally with and retainingly engage in a radially inwardly opening groove formation in a tire rim flange, there being a space between the radially outer portion and the radially inner portion of said peripheral formation defining a groove at the periphery of the wheel cover member, and a bordering annulus secured to the cover member and substantially concealing said groove, said annulus having an inner marginal formation extending generally axially and then radially outwardly and the axially extending portion of the marginal formation of the annulus retainingly engaging at the radially inner side of said axially extending retaining portion of said marginal formation of the cover member.

9. As an article of manufacture, a circular cover member having an outer marginal formation extending axially, then radially outwardly and then in reverse axial direction with the latter portion formed to conform generally with and retainingly engage in a radially inwardly opening groove formation in a tire rim flange, there being a space between the radially outer portion and the radially inner portion of said peripheral formation defining a groove at the periphery of the wheel cover member, and a bordering annulus secured to the cover member and substantially concealing said groove, said annulus having an inner marginal portion engaging against the radially outwardly facing side of the radially inner axially extending of said marginal formation of the cover member.

GEORGE ALBERT LYON.

REFERENCES CITED

The following references are of record in the file of this patent:

UNITED STATES PATENTS

| Number | Name | Date |
|---|---|---|
| 1,234,387 | Pugh et al. | July 24, 1917 |
| 2,101,318 | Lyon | Dec. 7, 1937 |
| 2,135,757 | Lyon | Nov. 8, 1938 |